United States Patent
Lim

(10) Patent No.: US 10,202,000 B2
(45) Date of Patent: Feb. 12, 2019

(54) AUTOMOBILE WHEEL HAVING VIBRATION DAMPING FUNCTION

(71) Applicant: Man Hee Lim, Gwangju-si (KR)

(72) Inventor: Man Hee Lim, Gwangju-si (KR)

( * ) Notice: Subject to any disclaimer, the term of this patent is extended or adjusted under 35 U.S.C. 154(b) by 218 days.

(21) Appl. No.: 14/886,648

(22) Filed: Oct. 19, 2015

(65) Prior Publication Data

US 2017/0058994 A1    Mar. 2, 2017

(30) Foreign Application Priority Data

Sep. 2, 2015 (KR) .................. 10-2015-0124175

(51) Int. Cl.
| | |
|---|---|
| *B60B 7/04* | (2006.01) |
| *B60B 7/00* | (2006.01) |
| *B60B 3/10* | (2006.01) |
| *B60B 7/06* | (2006.01) |

(52) U.S. Cl.
CPC .................. *B60B 7/04* (2013.01); *B60B 3/10* (2013.01); *B60B 7/0013* (2013.01); *B60B 7/066* (2013.01); *B60B 2900/111* (2013.01); *B60B 2900/131* (2013.01); *B60B 2900/133* (2013.01); *Y02T 10/86* (2013.01)

(58) Field of Classification Search
CPC .... B60B 7/00; B60B 7/02; B60B 7/04; B60B 7/066; B60B 7/065; B60B 7/08; B60B 7/068

See application file for complete search history.

(56) References Cited

U.S. PATENT DOCUMENTS

| | | | | |
|---|---|---|---|---|
| 3,397,920 A | * | 8/1968 | Aske, Jr. .................. | B60B 7/02 301/37.42 |
| 3,436,123 A | * | 4/1969 | Aske, Jr. .................. | B60B 7/02 301/37.26 |
| 3,549,204 A | * | 12/1970 | Spisak ...................... | B60B 7/14 301/37.371 |
| 3,554,536 A | * | 1/1971 | Richter .................... | B60B 7/14 301/108.4 |
| 3,669,501 A | * | 6/1972 | Derleth .................... | B60B 5/02 156/78 |
| 4,291,921 A | * | 9/1981 | Wulf ........................ | B60B 7/06 301/108.1 |
| 5,393,128 A | * | 2/1995 | Sarmast ................... | B60B 7/08 301/37.12 |

(Continued)

FOREIGN PATENT DOCUMENTS

| | | |
|---|---|---|
| JP | 2005-271766 A | 10/2005 |
| KR | 10-2007-0053386 A | 5/2007 |
| WO | 2000/076786 | 12/2000 |

*Primary Examiner* — Jason R Bellinger
(74) *Attorney, Agent, or Firm* — Law Offices of Albert Wai-Kit Chan, PLLC

(57) ABSTRACT

This invention relates to an automobile wheel having a vibration damping function. The automobile wheel includes a disk member connected with an axle hub and a rim member for mounting a tire. A hub cap is to be attached to or detached from one side of the disk member. A vibration damping plate in a shape corresponding to the hub cap is placed on one side of the hub cap to be in contact with the disk member. Vibration damping bushings are positioned at the vibration damping plate to be in contact with the disk member. The vibration damping plate and vibration damping bushings work together to attenuate vibration of the wheel.

7 Claims, 3 Drawing Sheets

(56) References Cited

U.S. PATENT DOCUMENTS

| | | | | |
|---|---|---|---|---|
| 6,106,075 A | * | 8/2000 | Suenaga | B60B 1/08 |
| | | | | 152/381.6 |
| 6,325,462 B1 | | 12/2001 | Hummel et al. | |
| 6,783,189 B1 | * | 8/2004 | Russell | B60B 7/068 |
| | | | | 301/37.12 |
| 6,955,405 B1 | * | 10/2005 | Hogan | B60B 7/0013 |
| | | | | 301/37.11 |
| 2017/0058993 A1 | * | 3/2017 | Lim | F16F 15/1407 |
| 2017/0108074 A1 | * | 4/2017 | Lim | B60B 1/06 |

* cited by examiner

AUTOMOBILE WHEEL HAVING VIBRATION DAMPING FUNCTION

CROSS-REFERENCE TO RELATED APPLICATION

This application claims the benefit of Korean Patent Application No. 10-2015-0124175, filed on Sep. 2, 2015, the disclosure of which is hereby incorporated herein by reference in its entirety.

BACKGROUND OF THE INVENTION

Field of the Invention

The present invention relates to an automobile wheel and more particularly, to an automobile wheel having a vibration damping function wherein a vibration damping apparatus is provided between a wheel and a hub cap, to decrease vibration.

Description of the Related Art

In general, automobile wheels are made of steel or aluminum. This kind of a wheel is secured to a wheel hub having a brake drum or a brake disc by a round head screw or conical head screw.

To improve the fuel-efficiency of an automobile by decreasing the weight of the automobile, aluminum which is a light material has been used for an automobile wheel. Further, a technology to structurally lighten the weight has been also developed.

Usually, when a wheel is designed, it is considered to primarily satisfy the strength requirements. The structures, such as the thicknesses and designs of a hub mounting section and a spoke section of a wheel, have been designed to satisfy the minimum required strength of the wheel. Then, a process for secondary weight lightening (decrease of weight) has been performed inside the hub mounting section and the spoke section of the wheel to improve the fuel-efficiency.

However, as the wheel weight has been lightened through the aforementioned ways, the stiffness becomes insufficient, causing vibration and noise of the wheel during the driving of the automobile. To prevent these problems, casting thickness is again provided inside the hub mounting section and the spoke section of the wheel. Even the entire shape of the wheel is thickened, thereby increasing the unnecessary stiffness rather than the minimum required strength. This again increases the weight and therefore, it restricts the improvement of fuel-efficiency.

Korean Patent Application No. 10-2006-0044653 (hereinafter referred to as 'Reference 1') discloses a technology to decrease weight and block noise by forming a hollow chamber in a rim. The technology of forming the hollow chamber in the rim and spokes is disclosed in not only Reference 1 but also Korean Patent Application Nos. 10-2007-0053386 and 10-1999-0062973. The method of forming the hollow chamber has the effect of reducing weight and absorbing noise but it has a problem in that durability is weakened.

Korean Patent Application No. 10-2007-0053386 (hereinafter referred to as 'Reference 2') discloses a technology to absorb noise and vibration by forming a hollow chamber in a rim and filling it with an aluminum foam core. The technology of forming the hollow chamber in the rim and spokes and filling it with the foam core has a better effect of absorbing noise in comparison with Reference 1 but a less effect in reducing weight.

The aforementioned automobile wheels and the technology thereof are disclosed in detail in 1: Korean Patent Application No. 10-2006-0044653; 2: Korean Patent Application No. 10-2007-0053386; and 3: Korean Patent Application No. 10-1999-0062973. These publications are hereby incorporated by reference in their entireties into this application to fully illustrate the state of the art.

SUMMARY OF THE INVENTION

Therefore, it is an object of the present invention to solve the above problems and to provide an automobile wheel having a vibration damping function by constituting a vibration damping apparatus between an automobile wheel and a hub cap, to decrease vibration and noise occurring in the automobile wheel itself.

It is another object of the present invention to provide an automobile wheel having a vibration damping function by making the vibration damping apparatus positioned between the automobile wheel and the hub cap using vibration damping rubber, to lighten the weight of the wheel itself.

In accordance with an embodiment of the present invention, there is provided an automobile wheel which a disk member connected with an axle hub and a rim member mounted with a tire, comprising: a hub cap positioned to be attachably/detachably connected with one side of the disk member; and a vibration damping plate in a shape corresponding to the hub cap positioned at one side of the hub cap to be in contact with the disk member, to attenuate vibration.

Further, the disk member may include the bolt holes at its one side and the vibration damping plate includes insertion bosses to be inserted into and internally in contact with the bolt holes.

In accordance with another embodiment of the present invention, there is provided an automobile wheel which includes a disk member connected with an axle hub and a rim member mounted with a tire, comprising: a hub cap positioned to be attachably/detachably connected with one side of the disk member; and a vibration damping bushing positioned at the hub cap to be in contact with the disk member, to attenuate vibration.

In accordance with another embodiment of the present invention, there is provided an automobile wheel which includes a disk member connected with an axle hub and a rim member mounted with a tire, comprising: a hub cap positioned to be attachably/detachably connected with one side of the disk member; a vibration damping plate in a shape corresponding to the hub cap positioned at one side of the hub cap to be in contact with the disk member, to attenuate vibration; and vibration damping bushings positioned at the vibration damping plate to be in contact with the disk member, to attenuate vibration.

Further, the disk member may include the bolt holes at its one side, an end of each of the vibration damping bushings may be inserted into and internally in contact with each of the bolt holes, and the vibration damping plate may include connection bosses protruding to be inserted into and internally in contact with the vibration damping bushings.

In accordance with another embodiment of the present invention, there is provided an automobile wheel which includes a disk member connected with an axle hub and a rim member mounted with a tire, comprising: a hub cap positioned to be attachably/detachably connected with one side of the disk member and including an indentation portion formed not to cover bolt holes of the disk member; a vibration damping plate in a shape corresponding to the hub cap positioned at one side of the hub cap to be in contact with the disk member, to attenuate vibration; and vibration damping bushings inserted into and internally in contact with the bolt holes of the disk member through the indentation portion of the hub cap.

Further, the vibration damping plate may be in a round, polygonal or radial shape, and the vibration damping bushing may be in a round or polygonal shape.

Further, the hub cap may include connection ribs protruding from its one side and the automobile wheel may further include a back vibration damping member inserted into the connection ribs. The automobile wheel may further include a back plate inserted into the connection ribs and the back vibration damping member is inserted inside the back plate. Further, the back plate may include a skirt portion which is inclined inwardly at its one side, to support the back vibration damping member inserted into the back plate.

Further, the disk member may include cavities having a diameter which becomes gradually bigger towards its end, and the cavities may be formed at the disk member, to be opposed to the bolt holes.

Advantageous Effects of the Invention

In the automobile wheel having the vibration damping function according to the present invention, the vibration and noise occurring in the automobile wheel itself is attenuated by the vibration damping apparatus provided between the wheel and the hub cap.

Further, in the automobile wheel having the vibration damping function according to the present invention, since the vibration damping apparatus provided between the wheel and the hub cap is made of a rubber material, the vibration and noise of the wheel itself are attenuated and the weight of the wheel itself is lightened.

BRIEF DESCRIPTION OF THE FIGURES

The above and other features and advantages of the present invention will become more apparent to those of ordinary skill in the art by describing in detail the preferred embodiments thereof with reference to the attached figures.

DETAILED DESCRIPTION OF THE INVENTION

The present invention will now be described more fully hereinafter with reference to the accompanying drawings, in which the preferred embodiment(s) of the invention is shown so that those of ordinary skill in the art can easily carry out the present invention.

The terms used herein are defined in consideration of the function(s) in the present invention and therefore, these terms may vary according to the intention or practice of a user or an operator. Accordingly, the definition of these terms shall be interpreted as having their meaning and concept in the context of the technical detail to work the invention rather than the simple names of the terms.

Further, the embodiments of the present invention do not limit the scope of the present invention but are just examples of the constituent elements described in the claims of the present invention. Accordingly, the embodiments including alternative constituent elements which are included in the technical idea throughout the specification of the invention and which are alternative as the equivalents in the constituent elements of the claims can be included in the scope of the claims of the invention.

Further, terms selected in the embodiments are used to distinguish one constituent element from the other constituent element(s) and therefore, the constituent elements shall not be limited by the terms. In describing the present invention, any detailed description of the relevant publicly known technology, which makes the gist of the present invention unnecessary obscure, will not be presented herein.

In the description of the present invention, based on a wheel of an automobile, a side towards the outside of a disk member and a rim member is referred to an "outside" and the side towards the internal space formed by the disk member and the rim member is referred to an "inside".

Figure 1:
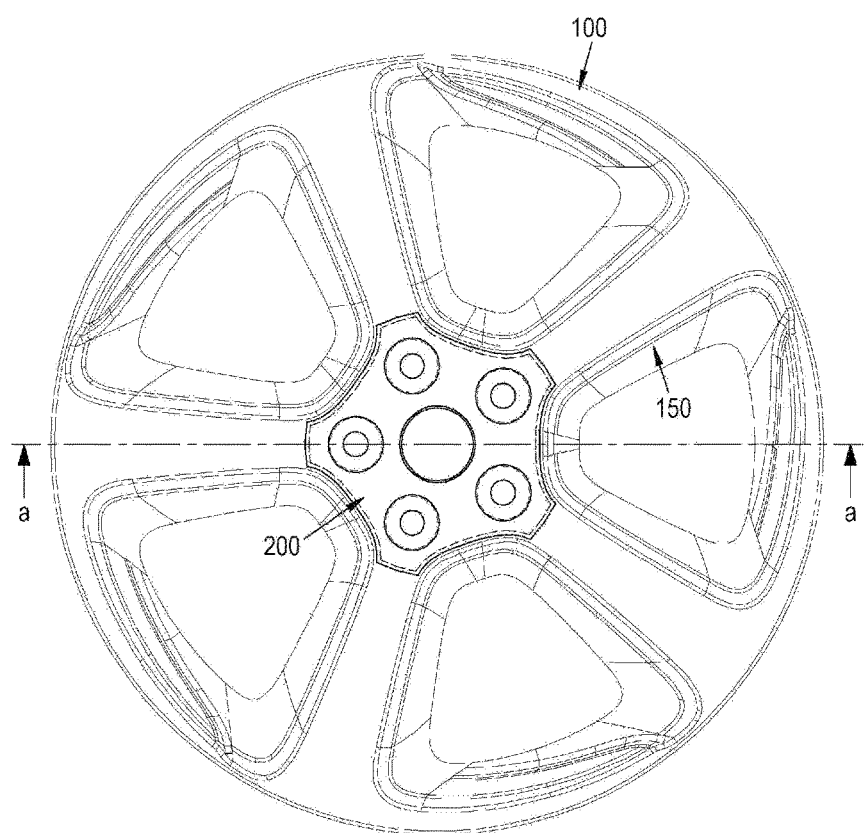
FIG. 1 is a front view of an automobile wheel according to the present invention.
Figure 2:
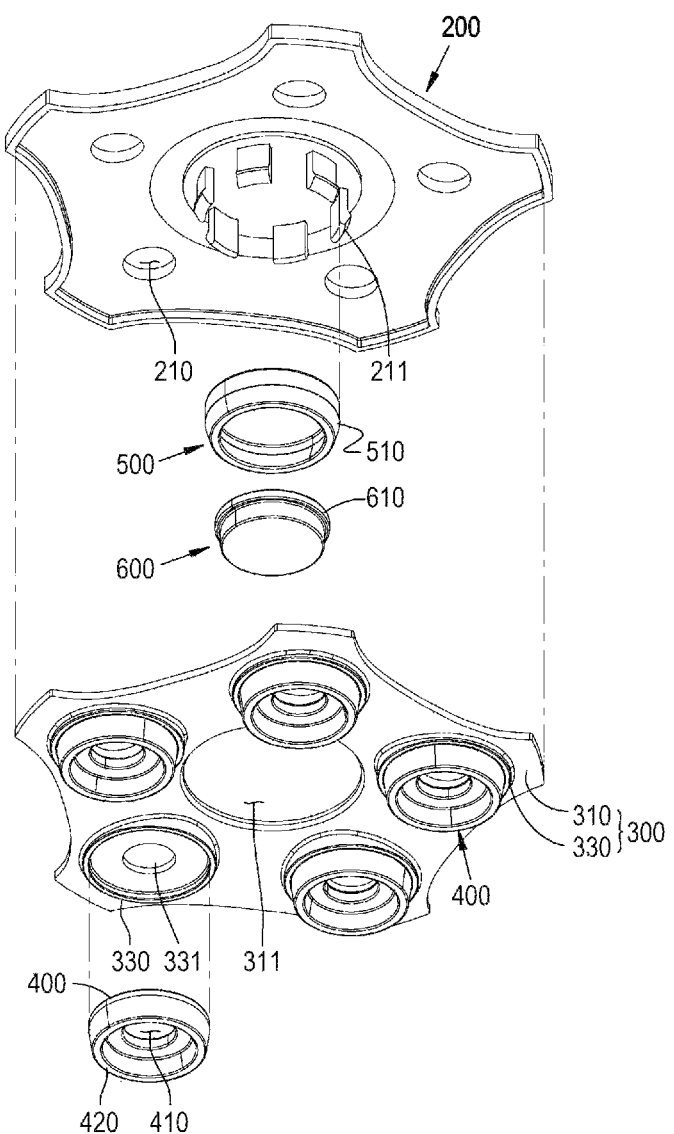
FIG. 2 is an exploded view of a back plate and a back vibration damping member provided in the hub cap of the automobile wheel according to the present invention.
Figure 3:
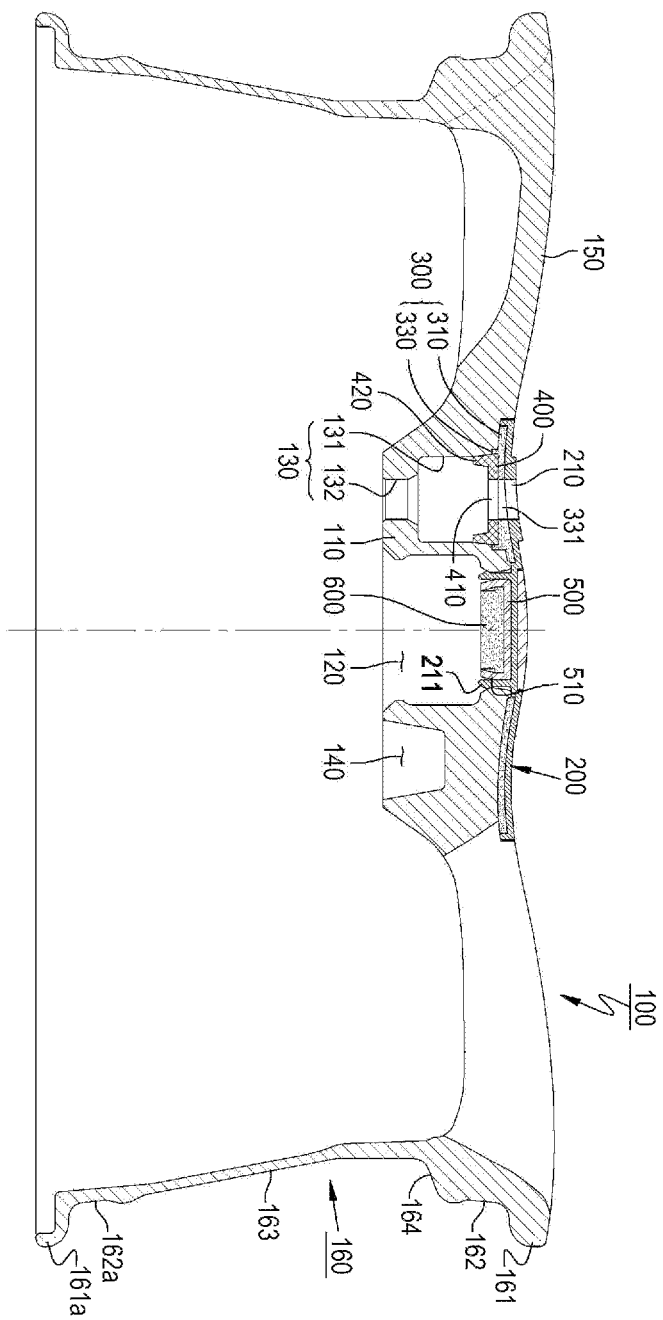
FIG. 3 is a cross-sectional view of the automobile wheel according to the present invention, taken along Line a-a Line shown in FIG. 1, in which the back plate and the back vibration damping member shown in FIG. 2 are connected together.

FIGS. 1 through 3 illustrate an automobile wheel having a vibration damping function according to an embodiment of the present invention.

As shown in FIGS. 1 and 3, in automobile wheel according to a embodiment of the present invention includes a disk member 100 with which an axle hub (not shown) is connected and a rim member 160 on which a tire (not shown) is mounted.

The disk member 100 includes a hub mounting section 110 and a spoke section 150. The hub mounting section 110 is in a disk shape, to be connected with the axle hub. The spoke section 150 radially extends from the outside of the hub mounting section 110 to the rim member 160.

Specially, as shown in FIG. 3, the hub mounting section 110 is formed in a solid type, except for a bolt hole 130 and a cavity 140 to fasten the axle hub using a bolt.

In this automobile wheel, a section connected with the axle hub (not shown) is a support end to receive the load of a cantilever. Therefore, the reason to make the solid hub mounting section 110 is for the support end to have the strength to bear the weight of the automobile itself and the impact load.

A hub hole 120 is formed in the center of the hub mounting section 110. A number of bolt holes 130 are formed, at regular intervals, in a circumferential direction, spaced apart from the hub hole 120, on the outside of the hub mounting section 110.

Each of the bolt holes 130 comprises a securing portion 131 and an insertion hole 132. The securing portion 131 is formed on the outside surface of the disk member 100 and has a relatively wide diameter so that a nut or cap nut to be inserted from the outside is secured. The insertion hole 132 is formed by extending to the inside surface of the disk member 100 and has a relatively narrow diameter so that a bolt provided to the axle hub passes through. The bolt of the axle hub, which passes through the insertion hole 132 of the bolt hole 130, is securely connected with the nut or cap nut.

The cavity 140 is provided between the bolt holes 130. A damper (not shown) made of a rubber material may be inserted into the cavity 140. The cavity 140 is formed in the disk member 100, to be opposite to the bolt hole 130, that is, on the inside surface of the disk member 100. The cavity 140 is formed such that its diameter becomes gradually smaller from the inside surface of the disk member 100 towards the center thereof.

This is to attenuate vibration and noise occurring in the wheel itself during the driving of the automobile by the cavity 140 having the diameter which becomes gradually bigger towards the inside end of the disk member 100 and the damper.

The securing portion 131 of the bolt hole 130 and the cavity 140 are positioned so as to be opposed to each other, thereby mutually reinforcing the strength of the disk member 100. That is, on the outside surface of the disk member 100, the interval between the hub hole 120 and the securing portion 131 is narrow but it is possible to maintain the strength by the solid hub mounting section 110 where the cavity 140 is not formed. On the inside surface of the disk member 100, the interval between the hub hole 120 and the cavity 140 is narrow but it is possible to maintain the strength since the space between the hub hole 120 and the insertion hole 132 of the bolt hole 130 is wide.

When the tire is mounted on the rim member 160 of the automobile wheel, a closed ring-shaped space is formed between the rim member 160 and the tire.

The rim member 160 comprises: flanges 161, 161a, bead seats 162, 162a, a well portion 163 and a well wall 164. The flanges 161, 161a are each positioned at the outside and inside ends of the rim member 160, to be in contact with the outer surfaces of both ends of the tire by side to side. The bead seats 162, 162a each extend from the flanges 161, 161a, to be formed in a flat surface to be in contact with both beads of the tire by side to side and to securely support the beads to be sit.

The well portion 163 is formed to be stepped between the bead seats 162, 162a, to have a diameter which is smaller than the diameter of the bead seats 162, 162a. The well wall 164 is formed to connect the outside bead seat 162 with the well portion 163.

The well portion 163 has the diameter which is smaller than the diameter of the bead seats 162, 162a such that the beads of the tire, which are in contact with the bead seats 162, 162a by side to side, release in the well portion 163.

The outside surface of the hub mounting section 110 of the disk member 100 is provided with a hub cap 200 to be attachable to/detachable from, as shown in FIGS. 2 and 3.

The hub cap 200 is made of a plastic material. The hub cap 200 may be formed in a round or polygonal shape to cover the bolt holes 130 of the hub mounting section 110. Otherwise, the hub cap 200 may be formed in a radial shape not to cover the bolt holes 130 of the hub mounting section 110. In the embodiment of the present invention, for example, the hub cap 200 having a polygonal shape will be described.

The hub cap 200 in the polygonal shape includes through holes 210 and connection ribs. The connection ribs (211) protrude in the center of the inside surface of the hub cap 200, to be inserted into and connected with the hub hole 120. The through holes 210 are formed at the circumference direction corresponding to the bolt holes 130 of the hub mounting section 110 and each of the through holes 210 is bored in the diameter corresponding to the insertion hole 132 of the bolt hole 130.

As shown in FIGS. 1 through 3, the automobile wheel according to an embodiment comprises a vibration damping plate 300 and a vibration damping bushing 400 positioned one by one between the hub cap 200 and the hub mounting section 110, to be attachable to/detachable from the outside surface of the hub mounting section 110.

The vibration damping plate 300 is formed of compressed rubber having a uniform thickness and the shape corresponding to the shape of the hub cap 200. The vibration damping plate 300 is connected with the inside surface of the hub cap 200.

As shown in FIGS. 2 and 3, the vibration damping plate 300 includes a flat portion 310 and connection bosses 330. The flat portion 310 is connected with the inside surface of the hub cap 200. The connection boss 330 protrudes from the inside surface of the flat portion 310.

The whole outside surface of the flat portion 310 of the vibration damping plate 300 is in contact with the inside surface of the hub cap 200 by side to side. The flat portion 310 includes the central hole 311 in its center. Each of the vibration damping plates 300 includes a through hole 331 in its center. The through hole 331 has the same function as the through hole 321 of the insertion boss 320 of the first embodiment as described above. The through hole 331 is positioned collinearly with the through hole 210 of the hub cap 200.

The vibration damping bushing 400 is formed of compressed rubber and includes a through hole 410 formed in its center and a skirt portion 420 protruding from its outer circumference portion in one direction. The vibration damping bushing 400 is inserted in the connection boss 330 of the vibration damping plate 300 and the through hole 410 of the vibration damping bushing 400 is positioned collinearly with the through hole 331 of the vibration damping plate 300. The skirt portion 420 of the vibration damping bushing 400 protrudes towards the hub mounting section 110, to be inserted in and internally in contact with the bolt hole 130 of the hub mounting section 110.

Therefore, since the vibration damping bushings 400 are in contact with the vibration damping plate 300 and the hub mounting section 110 by side to side and the vibration damping plate 300 is in contact with the hub cap 200 and the vibration damping bushing 400 by side to side, the vibration and noise occurring in the wheel itself during the driving of the automobile are absorbed and attenuated by the vibration damping plate 300 and the vibration damping bushings 400. Specifically, since the contact area between the vibration damping bushings 400 and the hub mounting section 110 is maximized through the skirt portions 420 of the vibration damping bushings 400, which is internally in contact with the bolt holes 130 of the hub mounting section 110, the vibration and noise occurring in the automobile wheel are maximally attenuated.

As described above, the vibration damping plate 300 and the vibration damping bushing 400s provided between the hub cap 200 and the hub mounting section 110 are in contact with the inside surface of the hub cap 200 and the outside surface of the hub mounting section 110 by side to side. Therefore, the vibration and noise occurring in the wheel itself during the driving of the automobile are absorbed and attenuated by the vibration damping plate 300, the vibration damping bushings 400, the bolt holes 130 of the hub mounting section 110 and the cavities 140. Further, the weight of the automobile wheel is lightened by the bolt holes 130 of the hub mounting section 110 and the cavities 140.

The automobile wheel according to the embodiment(s) of the present invention comprises a hub cap 200 including a number of connection ribs 211 at its one surface, that is, the surface facing the disk member 100. The connection ribs 211 protrude in a direction towards the circumference, to be inserted into and connected with the hub hole 120 of the disk member 100.

A back plate 500 is inserted into and connected with the connection ribs 211. The back plate 500 is formed of a round plastic material. The back plate 500 includes a skirt portion 510 protruding from its one surface towards the hub hole 120 of the disk member 100. An end of the skirt portion 510 is inwardly bent, to firmly support and connect with a back vibration damping member 600 (to be described below) which is inserted into the inside of the skirt portion 510.

The back vibration damping member 600 is formed of a round rubber material and inserted into the back plate 500. The back vibration damping member 600 includes a flange portion 610 protruding outwardly from its one surface facing the inside surface of the back plate 500. Therefore, as shown in FIG. 9, the back vibration damping member 600 having a relatively smaller diameter than the flange portion 610 is firmly inserted and supported in the skirt portion 510 which is inclined inwardly in the black plate 500.

Specifically, the back plate 500 and the back vibration damping member 600 provided to the connection ribs 211 of the hub cap 200 may be provided to the hub cap 200, separately from the vibration damping plate 300 or the vibration damping bushing 400. However, more preferably, as shown in FIG. 3, the back plate 500 and the back vibration damping member 600 are provided, together with the aforementioned vibration damping plate 300 and vibration damping bushing 400, to further improve the vibration damping function of the automobile wheel.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents.

Simple modifications or similar arrangements of the present invention belong to the category of the invention and therefore, the protection range of the invention will be apparent by the claims attached herewith.

What is claimed is:

1. An automobile wheel which includes a disk member (100) connected with an axle hub and a rim member (160) mounted with a tire, comprising:

a hub cap (200) positioned to be attachably/detachably connected with one side of the disk member (100);

a vibration damping plate (300) in a shape corresponding to the hub cap (200) positioned at one side of the hub cap (200) to be in contact with the disk member (100), to attenuate vibration; and vibration damping bushings (400) positioned at the vibration damping plate (300) to be in contact with the disk member (100), to attenuate vibration.

2. The automobile wheel according to claim 1, wherein the disk member (100) includes bolt holes (130) at one side of the disk member (100) and an end of each of the vibration damping bushings (400) is inserted into and internally in contact with each of the bolt holes (130).

3. The automobile wheel according to claim 1, wherein the vibration damping plate (300) is in a round, polygonal or radial shape.

4. The automobile wheel according to claim 1, further comprising:

connection ribs (211) protruding from one side of the hub cap (200); and a back vibration damping member (600) inserted into the connection ribs (211).

5. The automobile wheel according to claim 4, further comprising:

a back plate (500) inserted into the connection ribs (211) and receiving the back vibration damping member (600) in the inside of the back plate (500).

6. The automobile wheel according to claim 5, wherein the back plate (500) includes a skirt portion (510) which is inclined inwardly at one side of the back plate (500), to support the back vibration damping member (600) inserted into the back plate (500).

7. The automobile wheel according to claim 1, wherein the disk member (100) further includes cavities (140) having a diameter which becomes bigger towards the end of the disk member (100).

\* \* \* \* \*